__United States Patent Office__ 3,182,777
Patented May 11, 1965

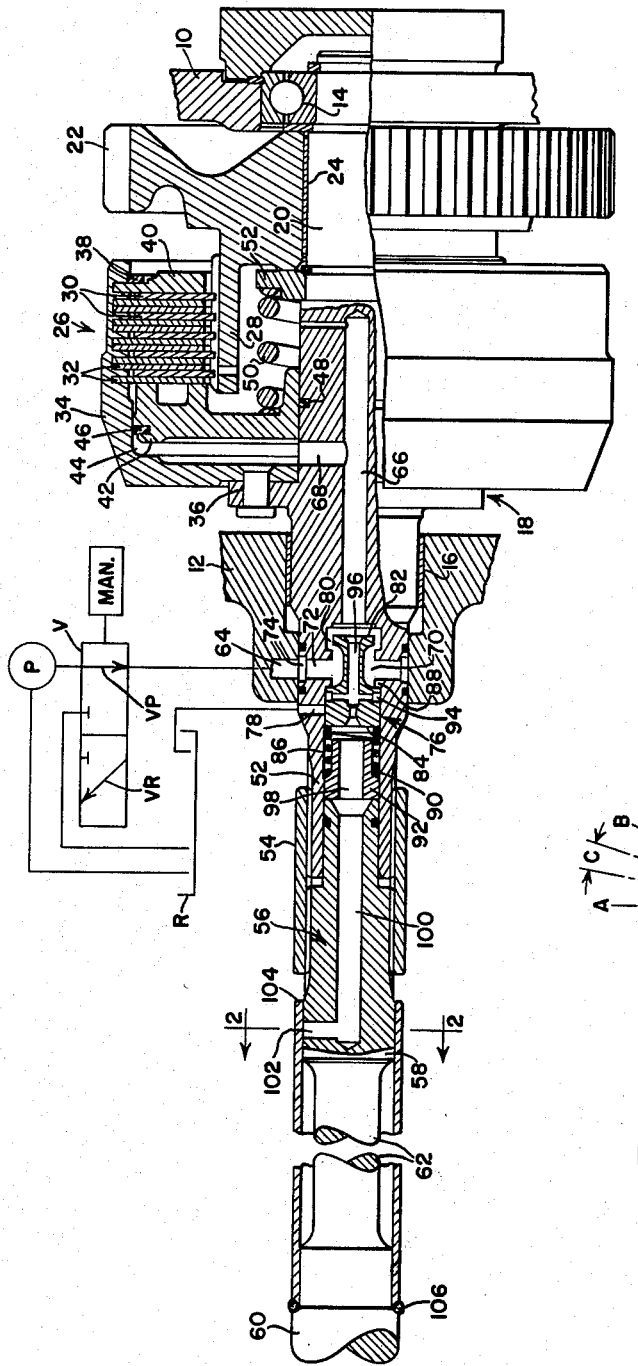

3,182,777
TORQUE-LIMITING DRIVE
Edgar P. Browning and Ross K. Brown, Cedar Falls, Iowa, assignors to Deere & Company, Moline, Ill., a corporation of Delaware
Filed Apr. 15, 1963, Ser. No. 273,025
5 Claims. (Cl. 192—56)

This invention relates to drive mechanism and more particularly to such mechanism as embodies means for limiting the maximum torque that can be transmitted by a pair of clutch-connected drive elements.

The invention further relates to that type of torque-limiting mechanism in which the clutch means is disengaged rather than allowed to slip, with provision for reengagement of the clutch when the excess torque condition disappears. The invention features the provision of means for controlling a fluid-pressure-operated clutch in response to deflections occurring in a driven part when excess torque is encountered. More specifically, the invention relates to and has for a principal object the provision of improved control means in a fluid-pressure-operated mechanism designed to transmit maximum torque under certain conditions, with a view toward the utilization in the design of parts adequately constructed to operate under normal conditions. For example, one of the defects in an ordinary slip-clutch situation is that the clutch, being allowed to slip, must be of relatively heavy and therefore expensive construction to absorb the wear potential that is imminent. If the clutch is constructed more economically, it is apt to slip under conditions slightly below maximum torque, and the purpose of the drive is defeated.

It is another object of the invention to utilize a shaft so constructed and related to valve means controlling the fluid-pressurizable clutch as to maintain the clutch in engagement until such times as excess torque causes deflection in the shaft, whereby the valve is controlled to enable disengagement of the clutch. It is another feature of the invention to utilize a differential valve and further to embody this valve in a compact construction in which the valve operates in a chamber included, along with related passages, in the shaft that forms part of the drive mechanism.

The foregoing and other important objects and desirable features inherent in and encompassed by the invention will become apparent as a preferred embodiment thereof is disclosed, by way of example, in the ensuing description and accompanying sheet of drawings, the figures of which are described below.

FIG. 1 is a view, partly in section and partly schematic, showing one embodiment of a clutch-connected and clutch-disconnectible driving mechanism.

FIG. 2 is an enlarged section on the line 2—2 of FIG. 1.

It will be recognized that the drive mechanism herein disclosed may be utilized in a wide variety of situations in which torque is transmitted to a driven shaft or its equivalent connectible to varying loads. The parts are normally designed to accommodate normal loads, but provision must be made for compensating for excess loads. As brought out above, the present invention relates to that type of design in which a clutch connecting the driving and driven parts becomes disconnected when excess torque and/or loads are encountered.

For the purposes of illustration, the mechanism is shown in association with suitable supporting structure, here represented as having front and rear support parts 10 and 12, the expressions "front" and "rear" being used for purposes of clarity only, since the structure may have other geographical disposition. The housing parts carry bearings at 14 and 16 respectively for journaling a rotary driven means 18, here comprising a shaft 20 having a forward part journaled in the bearing 14 and a rearward part journaled in the bearing 16. The forward portion of the shaft just rearwardly of the front bearing 14 has journaled thereon a rotary driving means 22, in the form of a gear journaled on the shaft portion by a suitable bearing 24.

The driving and driven parts or means 22 and 18 are clutch-connectible and clutch-disconnectible by a fluid-pressure-operated clutch indicated in its entirety by the numeral 26. This clutch includes a driving part 28, here formed integrally with the gear 22 and provided with an external spline by means of which it carries a plurality of clutch plates or disks 30. These plates are alternated with driven clutch plates 32 carried by an internal spline on a clutch annulus or bell 34 having a rear flange or wall rigidly connected to a cooperating flange on the shaft 20, the driving connection being effected in the area designated by the numeral 36. A snap ring 38 at the forward portion of the rim of the bell 34 affords an annular stop engageable with a stop ring 40, against which the clutch pack 30–32 is adapted to be compressed by a clutch piston 42 operating within a cylinder 44 formed internally of the bell 34. Appropriate seals at 46 and 48 seal the piston respectively relative to the cylinder 44 and shaft 20. A coil compression spring 50 acts between the front face of the piston 42 and a stop ring 52 for urging the piston to the left so as to disengage the clutch. This is typical of many clutches of similar types and the specific details form no part of the present invention, nor do they limit same.

The shaft 20 extends rearwardly as a coaxial externally splined shaft extension 52 and is spline-connected by a sleeve 54 to a coaxial rotary driven shaft 56. Just rearwardly of the splined connection to the sleeve 54, the shaft 56 is provided with a first portion 58 and at a considerable distance therefrom is provided with a rear portion 60, the intervening portion of the shaft being of reduced cross section as shown at 62. Although portions of the shaft have been broken away in the area of the reduced section 62, in order to conserve space in the drawings, it should be understood that this is substantially elongated. By way of example, in one commercially acceptable construction, the reduced section may be in the order of 36 inches long and between 1 and 1¼ inches in diameter, whereas the cross section in the areas 58 and 60 are in the order of 1¼ to 1½ inches. The shaft therefore has substantial resilience, at least for the purposes intended, as will be brought out below, and is capable of deflection under load. In the present case, this deflection is by way of twisting of the shaft so that angular movement occurs between the portions 60 and 58 because of the reduced-cross-sectional area of the portion 62. The shaft may be connected at its rear end 60 to varying loads.

Considered on the basis of the extent so far described, it will be seen that when the clutch is fluid-pressure engaged, it establishes a driving connection between the driving part or means 22 and the output end of the shaft 56, the latter being of course regarded as a coaxial extension of the main driven shaft 20. It will be evident that the clutch 26 must be designed to transmit torque for moving the loads likely to be encountered by the driven shaft 60. It will be further evident that if the power source to which the input or driving part 22 is connected is sufficient to transmit torque in excess of that capable of being in turn transmitted by the shaft 56 to overcome an unexpected load, stalling of the power source would therefore be unlikely, but damage would occur in the power train, such as slippage of the clutch 26, fracture of the shaft 56, fracture of the spline sleeve 54 etc. This would result in costly breakdown. It is therefore desirable to provide some form of means for accommodating overloads, and this is achieved in the present case by automatic disengagement of the clutch 26.

The schematic part of FIG. 1 shows a typical fluid circuit by means of which a manually controllable valve is selectively operative to establish and disestablish communication between the clutch cylinder 44 and a fluid pressure source, here represented by a pump P, having its intake side connected to a reservoir R and its output side connectible through the valve V to an inlet passage 64 in the housing part 12. The shaft 20 is provided with a first or axial passage 66 which leads via a radial passage 68 to the clutch cylinder 44. The rear portion of the axial passage 66 opens or is connected to a shaft-contained chamber 70 which has an inlet 72 in permanent communication with the fluid pressure inlet 64, the shaft being provided with an annular groove at 74 as is typical in rotating fluid-pressure connections.

Considering the rear end of the chamber 70 permanently closed, it will be seen that fluid pressure delivered by the pump P through the open valve V, the position of which is manually selected, as typically by the box labeled "Man.," pressurizes the cylinder 44 of the clutch 26 so that the piston 42 is forced to the right, thus compressing the clutch pack 30–32 and engaging the clutch between the driving and driven parts 22 and 20–56. When the valve V is moved manually to a position to the right of that shown, the passage 64 is connected to reservoir, the left-hand box of the valve utilizing an arrow VR as representative of the reservoir connection and the right-hand box of the valve using an arrow VP as representative of the pressure connection. The representation of the valve is typical of controls in this situation and here again the particular details do not limit the broad principles of the invention.

Now, for the purpose of making disengagement of the clutch 26 automatic, when the manual valve V is in the position shown in the drawings, which is the position in which clutch engagement is effected, the chamber 70 is provided with a differential valve 76 operative in the chamber to control the supply line or passage 66 as well as a radial exhaust outlet or passage 78, connected to reservoir as will be clear. When the differential valve is in the position shown, the inlet 72 is connected to the supply line or passage 66 via a supply port 80 which is left open by the front or small-area side 82 of the differential valve 76. As will be seen, the rear part of the differential valve 76 is enlarged to present a rear or large-area side 84, and, in the position of the differential valve in FIG. 1, the enlarged portion blocks the exhaust outlet or passage 78.

The shaft extension 52 is internally hollow, as by being a counterbore of the passage 66 and chamber 70, thereby providing a bore 86 in which the differential valve is axially movable. The junction of the bore 86 with the chamber 70 affords an annular shoulder 88 which affords a stop for the differential valve, limiting its forward position under action of a coiled compression spring 90, which acts at one end against the large-area side of the differential valve 76 and which acts at its other end against a drilled plug 92 which abuts the forward reduced end of the output or driven shaft 56. Thus, the differential valve 76 is always urged by the spring 90 to the position shown in FIG. 1.

If the differential valve 76 is shifted rearwardly from this position, the front portion 82 thereof will close the port 80 and thus break communication between the inlet 72 and the supply line 66. At the same time, a radial or cross passage 94 will move into radial register with the exhaust outlet 78. The differential valve is axially drilled at 96 to provide a relatively restricted passage which leads from the small-area side 82 thereof to the cross passage 94, whereupon fluid under pressure will escape to the reservoir and pressure on the piston 42 will diminish, enabling movement of the piston to the left under action of the clutch spring 50 so as to separate the clutch plates 30 and 32, incurring of course disengagement of the clutch and therefore discontinuance of drive from the part 22 to the driven part 20–56.

Control of the differential valve 76, so far as concerns its movement between the two positions or conditions just described, is achieved by means of a valve control outlet, here comprising an axial passage made up of the hollow interior 98 of the plug 92 and an axial passage 100 in the forward portion of the shaft 56 and a second or radial passage 102 in this portion of the shaft 56 which is normally closed by a control valve in the form of a sleeve 104 closely encircling the shaft portion 58, but not rigidly connected thereto, and rigidly connected at its other end to the shaft portion 60. The chamber 70 thus communicates through the differential valve internal passage 96 to the control passage 98–100–102, but, so long as the passage 102 is covered by the sleeve forward portion 104, the control passage just described is closed or blocked. Therefore, pressure rise in the chamber 70 is capable of pressurizing the clutch piston 42, because there will be no fluid flow through the differential valve passage 96 and the spring load of the spring 90 will keep the valve 76 in its forward or rightward position, against the stop 88, establishing communication between the inlet 64 and the supply line 66–68 and blocking exhaust flow through the exhaust outlet 78. However, it will be seen that if the control passage 98–100–102 is opened to reservoir, fluid flow will occur through the passage 96 of the differential valve 76, causing a pressure drop which creates a condition of lower fluid pressure on the rear side 84 of the valve 76 than on the front side 82, sufficient to overcome the spring 90 so that the differential valve 76 can move to its closed position (to the left), blocking the port 80 and opening the port 78. Thus, fluid will escape from the supply line and the clutch spring 50 will move the piston to the left so as to disengage the clutch.

As previously noted, the shaft 56 is of substantial length between its portions 58 and 60. This is true likewise of the control sleeve 104, the rear end of which is rigidly secured to the shaft portion 60, which may be effected in any manner, here indicated as being achieved by welding at 106. Since the shaft portion 60 can turn within limits relative to the shaft portion 58, it follows that the control sleeve 104 will turn with the shaft portion 60 and thus will turn relative to the shaft portion 58. As thus shown in FIG. 2, the control sleeve 104 is provided with an opening 108 which, under conditions in which normal torque is transmitted, is angularly offset from registry with the radial passage 102. Thus an imperforate portion of the forward part of the control sleeve 104 blocks the outlet from the passage 102. However, when excess torque is transmitted and the shaft portions 58 and 60 are deflected angularly, and the control sleeve 104 being constrained by the shaft portion 60, is overtaken by the shaft portion 58 to such extent that the radial passage 102 then becomes alined with the escape or outlet port 108. On the basis of adequate design, the amount of movement necessary to effect complete registry of the passage 102 with the escape outlet 108 can be readily calculated. The normal position of the parts is shown by the line A in FIG. 2, and the position in which the passage 102 is fully in registry with the escape port 108 is shown by the line B. However, as represented by the angle C, registry will occur sooner, permitting a "leak-off" of the control fluid. That is to say, as soon as the right-hand outer edge of the passage 102 crosses the left-hand edge of the escape port 108, fluid flow will start through the differential valve passage 96, permitting a decay of pressure in the clutch cylinder 44, and the force-differential condition described above causes the valve 76 to move to the left, where it will remain because of pressure from valve V, and at the same time there will be no fluid flow to the clutch passage 66 because the right-hand end 82 of the valve 76 cuts off the port 80. Since the front or left of the rear valve portion 84 is larger than the portion 82, the force-differential overcomes the spring 90. When the operator senses that the power shaft has stopped because of clutch disengagement, he returns valve V to clutch-disengaged position, and VR leads passage 64 to reservoir. This removes the effects of the pressure differential in the chamber 70 and the valve 76 returns to the right by force of the spring 90. The operator can then reengage the clutch via valve V.

Variations in maximum torque to be transmitted could be achieved by providing for angular adjustment of the tube or sleeve 104 relative to the shaft 60; e.g., adjustment means in lieu of the weld at 106.

It will be seen that the design involves simple principles and is of compact construction. The main components are coaxially self-contained and, particularly in enclosed situations, are fully lubricated and dirt-free. Where the mechanism is used in a transmission housing, for example, the exhaust from the control outlet 102 via the escape or control port 108 may be directly to the transmission sump, if transmission fluid is employed. If otherwise, a line may be extended from the escape port 108 to the reservoir R, utilizing a conventional slip coupling similar to that employed at 74 for the connection between the inlet 64 and the chamber inlet 72. Disengagement of the clutch is fully automatic in response to excess torque and load. Since disengagement of the clutch is involved, overload slip is not a factor and long clutch life can be expected. Fundamentally, disengagement of the clutch prevents damage to driving parts such as the shafts and coaxial components thereof. The design eliminates the use of chattering slip clutches and the necessity for replacing shear pins and the like.

Features and advantages other than those categorically enumerated will readily occur to those versed in the art, as will many modifications and alterations in the preferred embodiment disclosed, all of which may be achieved without departure from the spirit and scope of the invention.

What is claimed is:

1. In combination: driving means; rotary driven means; clutch means fluid-pressurizible to engaged condition to interconnect and depressurizible to disconnect said two means; fluid pressure means including an inlet adapted for connection to a fluid pressure source, a supply line to the clutch means, an exhaust port and a first valve movable between a first position connecting the supply line exclusively to the inlet and a second position connecting the supply line to both the inlet and the exhaust port; torque-responsive means including a control line to reservoir and a second valve closing said control line at or below predetermined torque values and opening said control line at excess torque values; and valve regulating means including pressure-receivable portions acting on the first valve to hold said first valve in its first position when the second valve closes the control line and to cause said first valve to shift to its second position when the second valve opens said control line, said valve regulating means causing said first valve to remain in its second position under influence of inlet pressure even though said second valve returns to its closed position, and said valve regulating means including means for moving said first valve to its first position upon disconnection of said inlet from the fluid pressure source.

2. In combination: driving means; rotary driven means; clutch means fluid-pressurizible to engaged condition to interconnect and depressurizible to disconnect said two means; a rotary shaft connected to and receivable of torque from the driven means and connectible to varying loads to transmit torque at a predetermined value, said shaft being yieldable to deflect in response to excess torque; said shaft having a valve chamber therein including an inlet connected to the pressure source, a supply line leading to the clutch means, an exhause outlet, and a control outlet leading to exhaust; a control valve normally closing the control outlet and operative in response to excess torque applied to the shaft to open said control outlet; and a differential valve movable in said chamber between a first position connecting the inlet and supply line and closing the exhaust outlet and a second position closing said supply line and opening said exhaust outlet, said differential valve having a small-area portion exposed to inlet pressure and a large-area portion exposed to both inlet pressure and the control outlet, and means biasing said differential valve to its first position, said differential valve having a restricted passage therethrough interconnecting said two portions whereby said differential valve assumes its first position while the control outlet is closed and its second position when the control outlet is open.

3. The invention defined in claim 2, in which: the shaft is deflectible in twisting of a first portion thereof about the shaft axis relative to a second portion thereof spaced axially from said first portions, the control outlet includes a radial passage in one portion leading externally of the shaft, and means connecting the control valve to the other portion for normally closing said radial passage and for shifting angularly to open said passage upon relative twisting of said portions.

4. In combination: driving means; rotary driven means; clutch means fluid-pressurizible to engaged condition to interconnect and depressurizible to disconnect said two means; a rotary shaft connected to and receivable of torque from the driven means and connectible to varying loads to transmit torque at a predetermined value, said shaft being yieldable to deflect in response to excess torque; said shaft having a valve chamber therein including an inlet connected to the pressure source, a supply line leading to the clutch means, an exhaust outlet, and a control outlet leading to exhaust; a control valve normally closing the control outlet and operative in response to excess torque applied to the shaft to open said control outlet; and a differential valve movable in said chamber between a first position connecting the inlet and supply line and closing the exhaust outlet and a second position closing said supply line and opening said exhaust outlet, said differential valve having a small-area portion exposed to inlet pressure and a large-area portion exposed to both inlet pressure and the control outlet, and means biasing said differential valve to its first position, and means providing a restricted passage therethrough, said differential valve having a restricted passage therethrough interconnecting said two portions whereby said differential valve assumes its first position while the control outlet is closed and its second position when the control outlet is open.

5. In combination: driving means; rotary driven means; clutch means fluid-pressurizible to engaged condition to interconnect and depressurizible to disconnect said two means; a rotary shaft connected to and receivable of torque from the driven means and connectible to varying loads to transmit torque at a predetermined value, said shaft being yieldable to deflect in response to excess torque; means providing a valve chamber including an inlet connected to the pressure source, a supply line leading to the clutch means, an exhaust outlet, and a control outlet leading to exhaust; a control valve normally closing the control outlet and operative in response to excess torque applied to the shaft to open said control outlet; and a valve movable in said chamber between a first position connecting the inlet and supply line and closing the exhaust outlet and a second position closing said supply line and opening said exhaust outlet, and means acting on the chamber valve, including valve portions receivable of inlet pressure in the chamber, for moving said chamber valve to its first position when the control valve is closed and for moving said chamber valve to its second position when the control valve is open and for retaining said chamber valve in said second position irrespective of the condition of the control valve so long as said chamber remains connected to the pressure source.

References Cited by the Examiner

UNITED STATES PATENTS

| | | | |
|---|---|---|---|
| 2,476,632 | 7/49 | Shaff | 192—30.5 |
| 2,783,628 | 3/57 | Hallewell | 192—54 |
| 3,107,765 | 10/63 | Davies | 192—56 |

DAVID J. WILLIAMOWSKY, *Primary Examiner.*